Aug. 9, 1932.                 O. J. HORGER                 1,871,061
                           SPLIT AXLE HOUSING
                           Filed Nov. 4, 1931
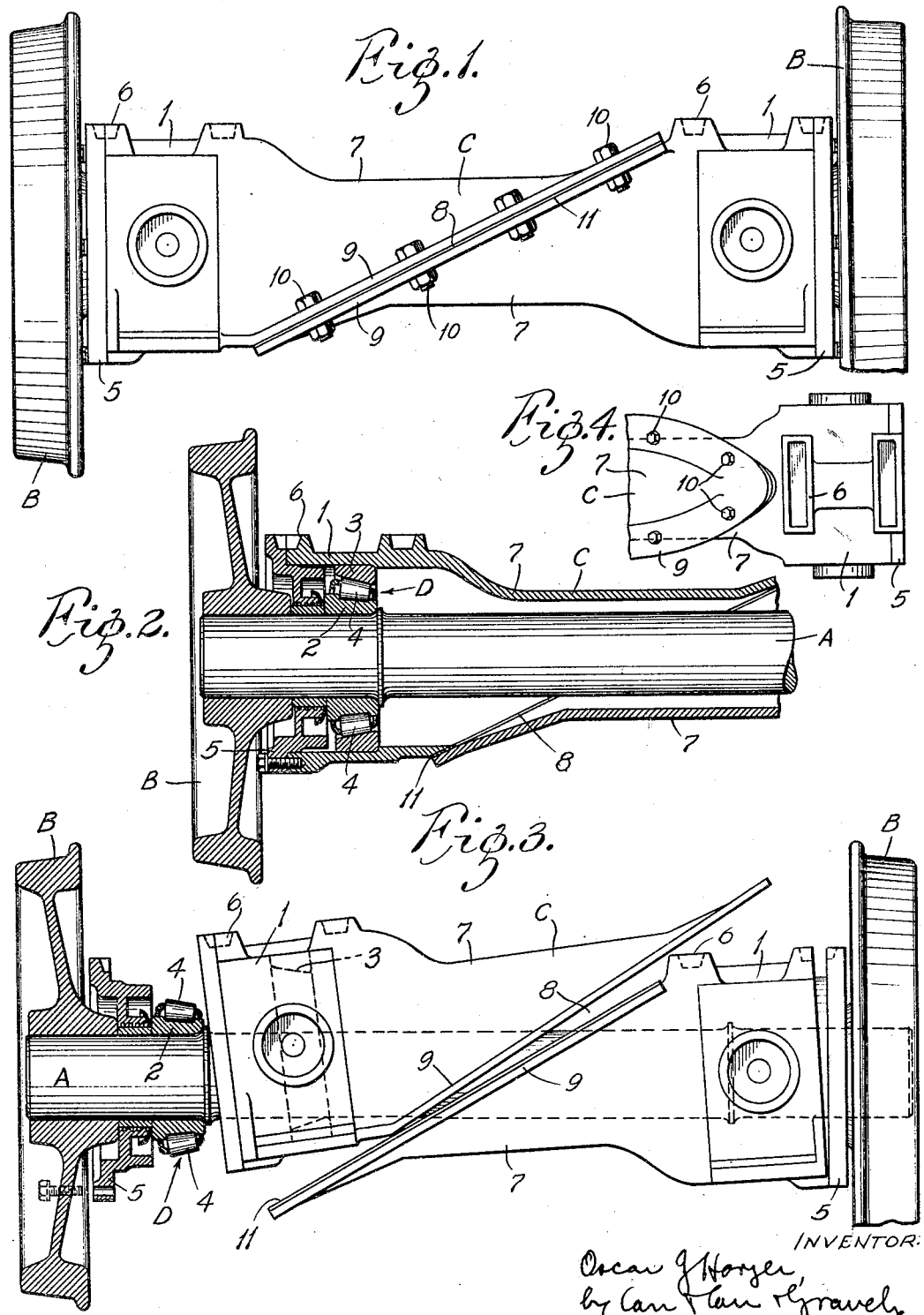

Patented Aug. 9, 1932

1,871,061

UNITED STATES PATENT OFFICE

OSCAR J. HORGER, OF CANTON, OHIO, ASSIGNOR TO THE TIMKEN ROLLER BEARING COMPANY, OF CANTON, OHIO, A CORPORATION OF OHIO

SPLIT AXLE HOUSING

Application filed November 4, 1931. Serial No. 572,932.

My invention relates to split axle housings, particularly housings of the inboard type for the axles of railway rolling stock. The invention has for its principal object a construction that facilitates the operation of inspecting roller bearings in the ends of the housing.

The invention consists principally in an axle housing split diagonally throughout the greater portion of its length, but having solid end ring portions for receiving roller bearings. The invention further consists in the split axle housing and in the parts and combinations and arrangements of parts hereinafter described and claimed.

In the accompanying drawing,

Fig. 1 is an elevation of a split railway car axle housing embodying my invention, Fig. 2 is a fragmentary vertical longitudinal sectional view, Fig. 3 is a view similar to Fig. 1 showing the parts of the housing separated to facilitate inspection of the bearings, and Fig. 4 is a partial top plan view showing one end portion of the housing.

In the drawing is illustrated a railway car axle A having wheels B on the ends thereof and provided with an axle housing of the inboard type indicated generally by C whose enlarged end portions constitute chambers in which are mounted taper roller or other antifriction bearings D. The drawing illustrates taper roller bearings D, each comprising a cone 2 mounted in the axle A, a cup 3 mounted in the end 1 of the housing and conical rollers 4 therebetween, said rollers 4 being disposed with their small ends towards the middle of the axle A. Suitable closure rings 5 are secured to the ends of the housing and the upper end portions 6 of the housing are shaped to cooperate with a truck side frame.

According to my invention, the axle housing C is split to form two separable parts 7, the split 8 between said parts occurring on a diagonal plane extending from a point adjacent to the lower inner edge of one of said enlarged end portions 1 of the axle housing to a point adjacent to the upper inner edge of the other enlarged end portion 1. Thus the split is confined to the body of the housing, stopping short of the enlarged ends so as to provide a continuous circumferential support for the outer bearing members of the bearings. Flanges 9 extend along the slanting edges of said split 8 and the parts 7 of the housing are secured together by bolts 10 extending through said flanges 9, a suitable gasket 11 being interposed between said housing parts. Said flanges 9 converge at their ends as shown in Fig. 4.

When it is desired to inspect the bearings, the housing parts 7 may easily be withdrawn from the bearings D by removing the securing bolts 10, the cups remaining in the ends of the housing. Thus the bearings may be inspected without interfering with their adjustment and the parts may be easily restored to their original position. The cups may be easily removed from the ends of the housing if necessary.

What I claim is:

1. A housing for roller bearing car axles split diagonally.

2. A housing for roller bearing car axles split diagonally throughout its body portion and having continuous annular end portions.

3. A housing for roller bearing car axles having enlarged end portions constituting chambers for said bearings, said housing being split along a diagonal plane extending through the body of said housing but stopping short of said enlarged end portions.

4. A housing for roller bearing car axles having enlarged end portions constituting chambers for said bearings, said housing being split along a diagonal plane extending from points adjacent to the inner edges of said enlarged end portions.

5. A housing for roller bearing car axles having enlarged end portions constituting chambers for said bearings, said housing being split along a diagonal plane extending from a point adjacent to the lower inner edge of one of said enlarged end portions to a point adjacent to the upper inner edge of the other enlarged end portion.

Signed at Canton, Ohio, this 30th day of October, 1931.

OSCAR J. HORGER.